UNITED STATES PATENT OFFICE.

VIRGINIA CAROLINE WEST, OF WILMINGTON, DELAWARE.

COMPOSITION FOR REMOVING RUST.

SPECIFICATION forming part of Letters Patent No. 637,910, dated November 28, 1899.

Application filed May 31, 1899. Serial No. 718,936. (No specimens.)

*To all whom it may concern:*

Be it known that I, VIRGINIA CAROLINE WEST, residing at 1011 Kirk avenue, Wilmington, in the county of New Castle, State of Delaware, have invented a new and useful Composition of Matter for Removing Rust and Rust-Stains from Linen and Cotton Fabrics, of which the following is a specification.

The composition is composed of pure water, sixteen ounces; oxalic acid, one ounce; Horsford's acid phosphate, one ounce. These ingredients are to be thoroughly mingled by agitation.

Horsford's acid phosphate is a well-known commercial product prepared at the Rumford Chemical Works, Providence, Rhode Island. The manufacturers describe it to be "a liquid solution of the phosphates of lime, magnesia, potash, and iron, with phosphoric acid."

In using the above-named composition the parts are to be thoroughly cleansed from dirt and impurities. Then saturate well with the composition and expose to sun or light until the rust disappears. Then the material is to be washed in several waters to remove all traces of the composition.

What I claim, and desire to secure by Letters Patent of the United States, is—

The described composition of matter to be used for removing rust and rust-stains from cotton and linen fabrics, consisting of pure water, oxalic acid and Horsford's acid phosphate in the proportions specified.

VIRGINIA CAROLINE WEST.

Witnesses:
 MARGARET E. AARON,
 HANNAH C. CHANCE.